United States Patent
Van Der Sluis (10) Patent No.: US 8,601,979 B2
(45) Date of Patent: Dec. 10, 2013

(54) MILKING BOX AND COW STABLE COMPRISING SUCH A MILKING BOX

(75) Inventor: Peter Willem Van Der Sluis, IJsselmuiden (NL)

(73) Assignee: Technologies Holdings Corporation, Houston, TX (US)

( * ) Notice: Subject to any disclaimer, the term of this patent is extended or adjusted under 35 U.S.C. 154(b) by 0 days.

(21) Appl. No.: 13/588,770

(22) Filed: Aug. 17, 2012

(65) Prior Publication Data

US 2013/0036974 A1   Feb. 14, 2013

Related U.S. Application Data

(63) Continuation of application No. PCT/NL2011/050111, filed on Feb. 17, 2011.

(30) Foreign Application Priority Data

Feb. 19, 2010   (NL) ...................................... 2004272

(51) Int. Cl.
*A01J 5/017* (2006.01)
(52) U.S. Cl.
USPC ...................................... 119/14.03; 119/520
(58) Field of Classification Search
USPC ........... 119/14.03, 14.18, 516, 520, 521, 523, 119/524
See application file for complete search history.

(56) References Cited

U.S. PATENT DOCUMENTS

| 2,593,597 | A  | * | 4/1952 | Palmer .......................... 119/520 |
| 5,718,186 | A  | * | 2/1998 | van der Lely .............. 119/14.08 |
| 5,878,692 | A  | * | 3/1999 | Ornerfors .................. 119/14.08 |
| 6,044,793 | A  | * | 4/2000 | van der Lely .............. 119/14.03 |
| 7,421,977 | B2 | * | 9/2008 | Van Den Berg .............. 119/520 |
| 7,484,474 | B2 | * | 2/2009 | Van Den Berg et al. ... 119/14.02 |
| 8,087,382 | B2 | * | 1/2012 | Sundborger ............... 119/14.02 |

FOREIGN PATENT DOCUMENTS

WO   WO2005/112613   12/2005

* cited by examiner

*Primary Examiner* — Yvonne Abbott
(74) *Attorney, Agent, or Firm* — Baker Botts L.L.P.

(57) ABSTRACT

Milking box or boxes for cows, each milking box having two entrance fences for entry and two exit fences, wherein one first entrance fence and one first exit fence form a first pair of fences positioned at a first side, and one second entrance fence and one second exit fence form a second pair of fences at a second side which is opposite the first side. This type of milking box used in a cow stable further comprises resting boxes, at least one feeder trough, a separation zone or zones, and walking paths, wherein at least the resting boxes are placed at the first side of the milking box or boxes, and that at the second side of the milking box or boxes at least one is placed selected from the group comprising at least one feeder trough, a separation zone or zones, or outdoors.

8 Claims, 9 Drawing Sheets

MILKING BOX AND COW STABLE COMPRISING SUCH A MILKING BOX

CROSS-REFERENCE TO RELATED APPLICATIONS

This application is a continuation application of International Patent Application Serial No. PCT/NL2011/050111, entitled "Milking Box and Cow Stable Comprising Such a Milking Box" to Rotech Special Projects B.V., filed on Feb. 17, 2011, which is a continuation of Netherlands Patent Application Serial No. 2004272, entitled "Milking Box and Cow Stable Comprising Such a Milking Box," filed on Feb. 19, 2010 and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The invention relates to a milking box for cows, comprising at least at one of its sides an entrance fence for entry of a cow and an exit fence for exiting a cow after it being milked. The invention is also concerned with a cow stable comprising resting boxes for cows, milking boxes, at least one feeder trough, a separation zone or zones, and walking paths allowing the cows to move between the resting boxes, milking boxes, the at least one feeder trough and the separation zone or zones.

2. Description of Related Art

Milking box or boxes are well known in the art and are conventionally placed in the middle or at one of the sides of the cow stable. Whenever a cow in the stable needs to be milked, the cow moves to the milking box at which the cow will be milked manually, semi-automatically, or automatically. When the milking operation has been completed the cow leaves the milking box at the same side as it entered, and either returns to its resting box, or moves to the feeding trough. Occasionally the cow can be separated, for instance if the milking operation was unsatisfactory, or when the cow is recognized (by automatic recognition means) as being nominated for a checkup.

One of the problems with existing cow stables is that it requires quite complicated fencing to have a cow move from the milking box to a separation zone.

Another problem with prior art cow stables is that the cows and people that need to work in the stable share the same room, which is not always desirable.

Still another problem with prior art cow stables is that it requires quite some labor to secure that each cow is moved from a first position within or outside the cow stable to a second position within or outside the cow stable.

BRIEF SUMMARY OF THE INVENTION

It is an object of the invention to alleviate or remove one or more of the above-mentioned problems that pertain to the cow stable of the prior art.

According to the invention a milking box and a cow stable are proposed in accordance with the appended claims.

BRIEF DESCRIPTION OF THE SEVERAL VIEWS OF THE DRAWINGS

The invention will hereinafter be further elucidated with reference to the drawing.

In the drawings.

Wherever in the figures the same reference numerals are applied, these numerals refer to the same parts.

DESCRIPTION OF THE INVENTION

The milking box of the invention has two entrance fences and two exit fences, wherein one first entrance fence and one first exit fence form a first pair of fences positioned at a first side, and one second entrance fence and one second exit fence form a second pair of fences that is positioned at a second side which is opposite to the first side.

In accordance with the invention the cow stable that is implemented with such a milking box or milking boxes, is arranged such that at least the resting boxes are placed at the first side of the milking box or boxes, and that at the second side of the milking box or boxes at least one is placed that is selected from the group comprising at least one feeder trough, a separation zone or zones, outdoors. The milking box of the invention thus provides the possibility that the movement of the individual cows can be controlled and that accurate track can be kept of each individual cow that has been milked. It is also possible to regulate the movement of the cows between indoors and outdoors of the cow stable, and between different parts within the cow stable.

DETAILED DESCRIPTION OF THE INVENTION

Figure 1:
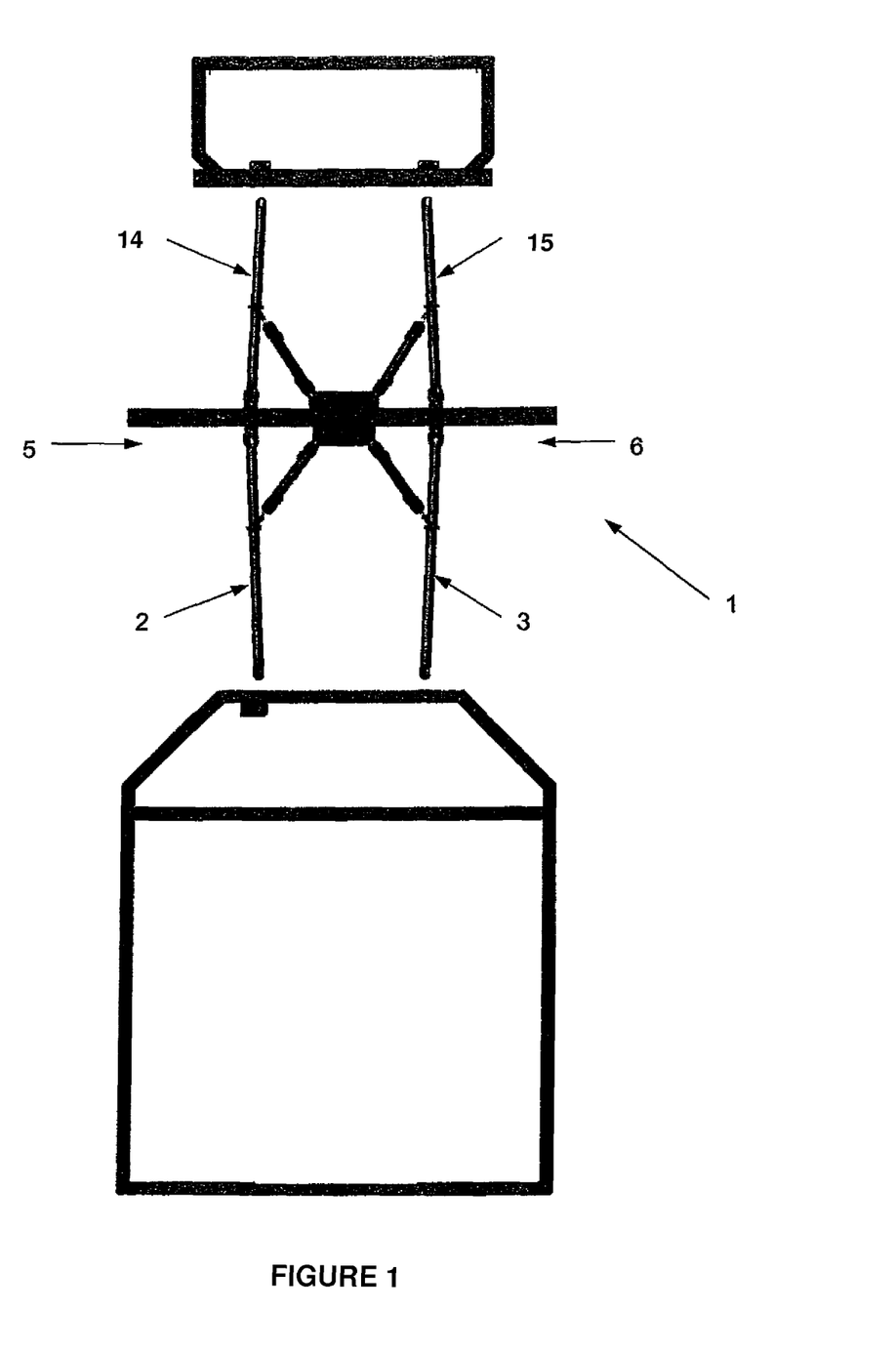
FIG. 1-FIG. 5 show several operational positions of the milk box of the invention.

Referring first to FIG. 1 a milking box 1 for cows is shown, having two entrance fences 2, 3 for entry of a cow and two exit fences 14, 15 for exiting a cow after it being milked. In this milking box 1 one first entrance fence 2 and one first exit fence 14 form a first pair of fences 2, 14 positioned at a first side 5, and one second entrance fence 3 and one second exit fence 15 form a second pair of fences 3, 15 that is positioned at a second side 6 which is opposite to the first side 5.

Figure 2:
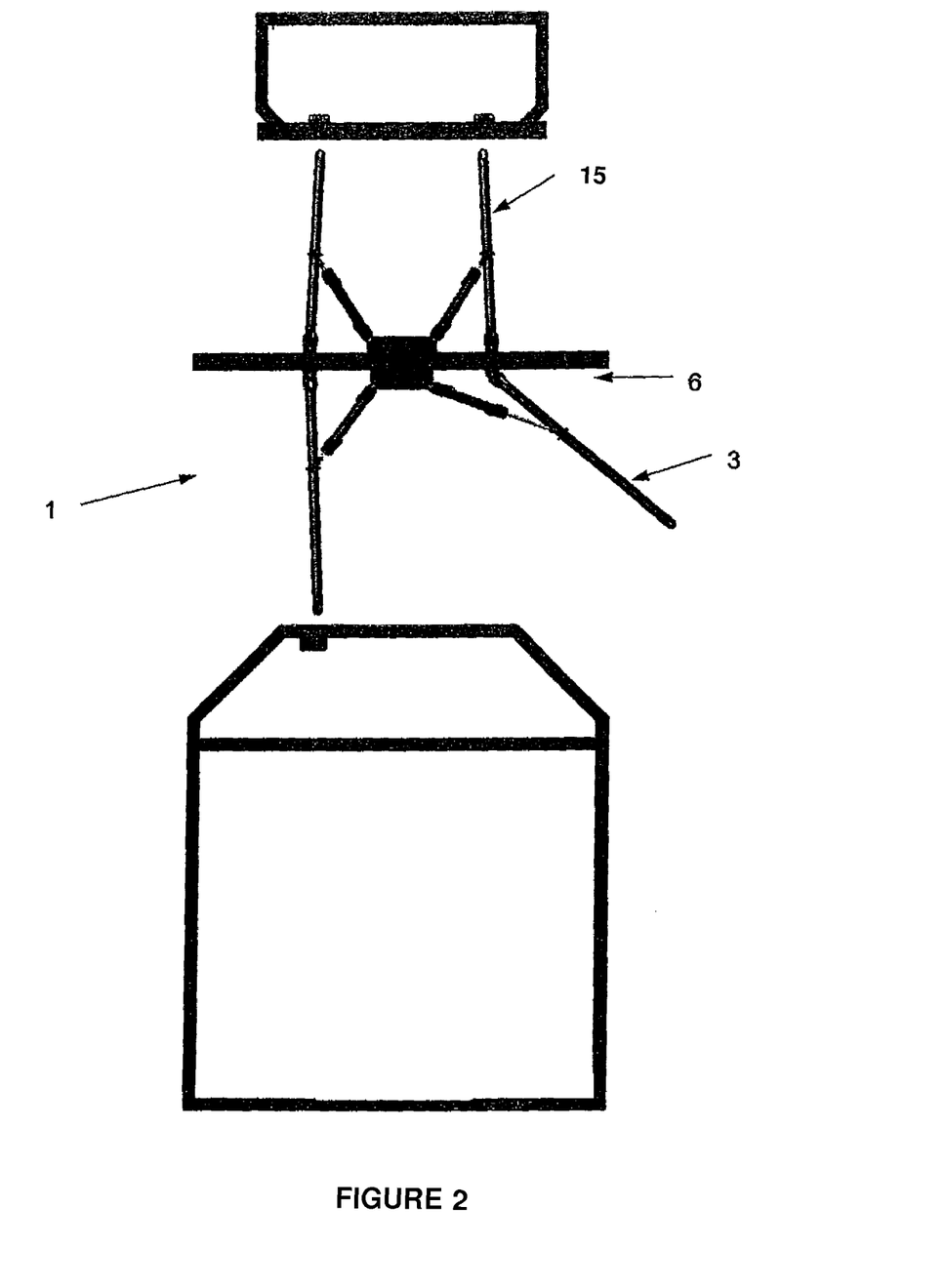
Figure 4:
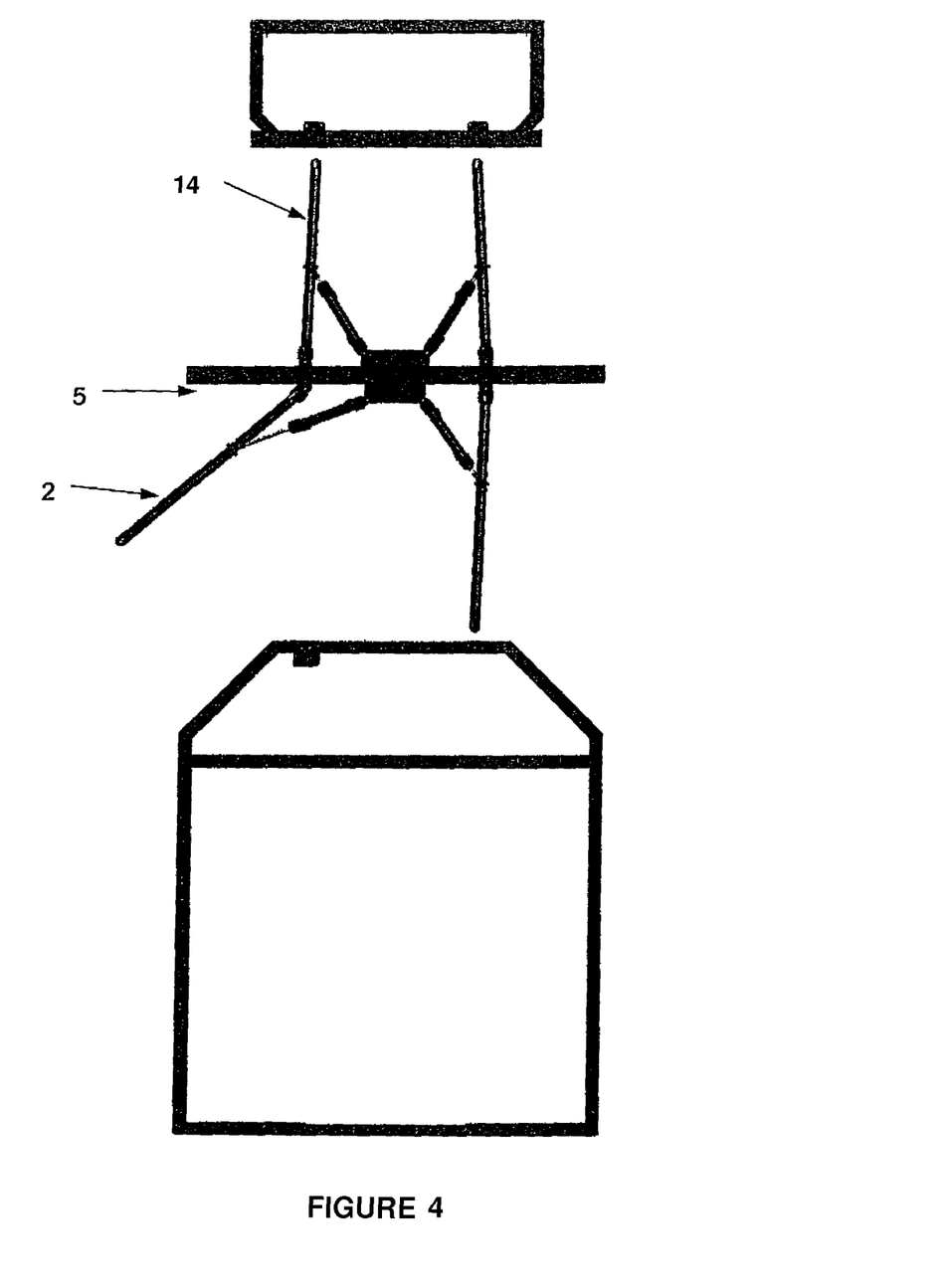

FIG. 2 and FIG. 4 respectively show that for entry of a cow into the milking box 1, either the entry fence 3 located at the second side 6, or the entry fence 2 that is located at the first side 5 may be operated.

Figure 3:
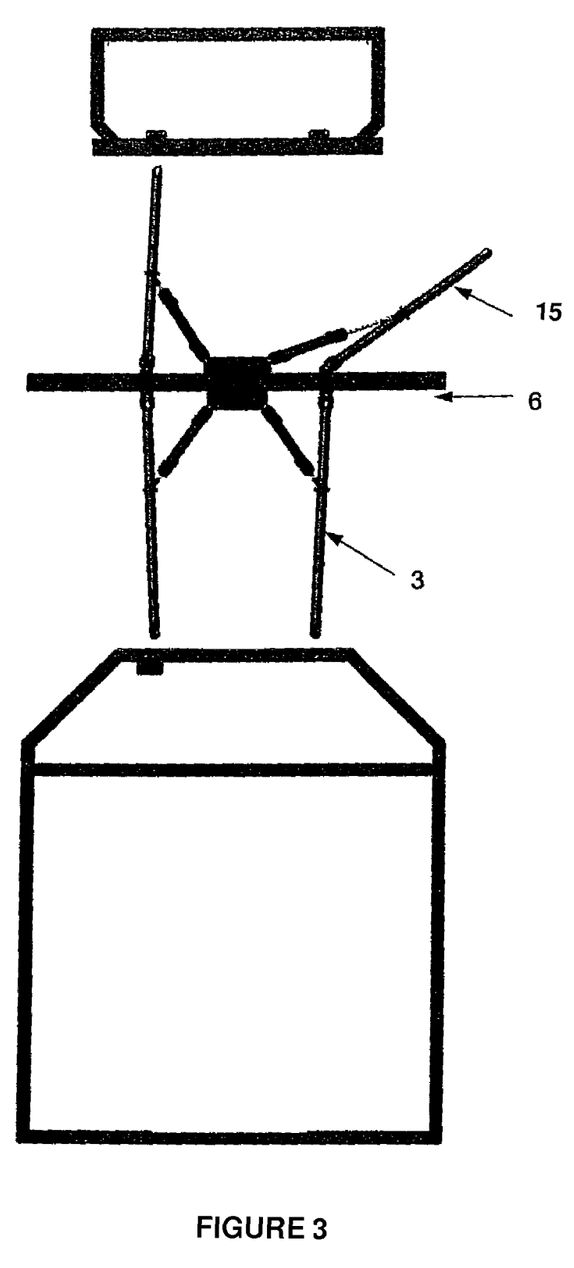
Figure 5:
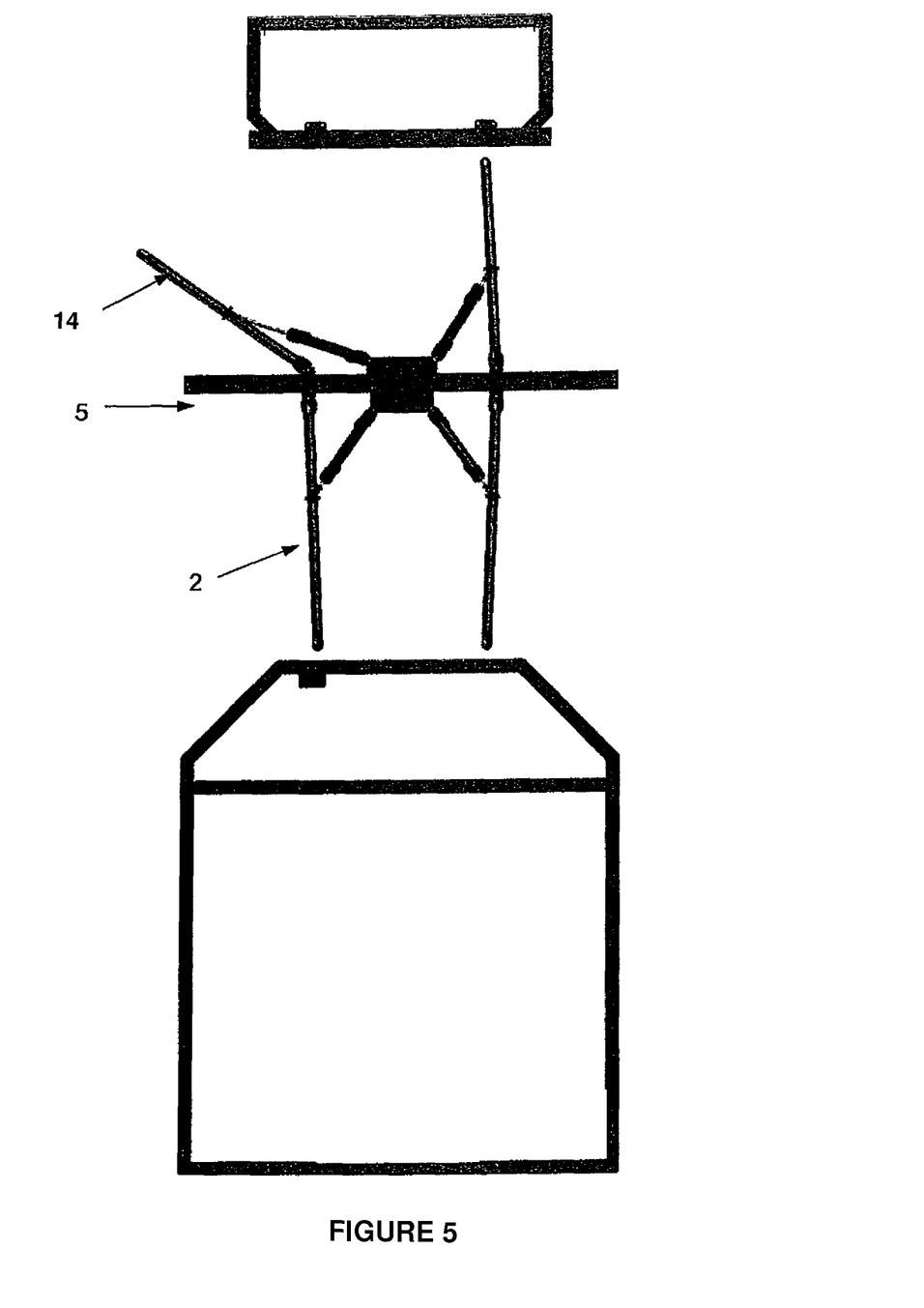

FIG. 3 and FIG. 5 respectively show that for having the cow leave the milking box 1, either the exit fence 15 at the second side 6, or the exit fence 14 that is located at the first side 5 may be operated.

It will be clear for the artisan that the side 5, 6 at which the cow enters the milk box 1 can be selected independent from the side 5, 6 at which the cow will leave the milk box 1. Consequently milk box 1 of the invention provides flexibility and versatility to any cow stable in which it is used, which is clearly demonstrated in the embodiments of the cow stable of the invention shown in the FIG. 6-FIG. 9.

Figure 6:
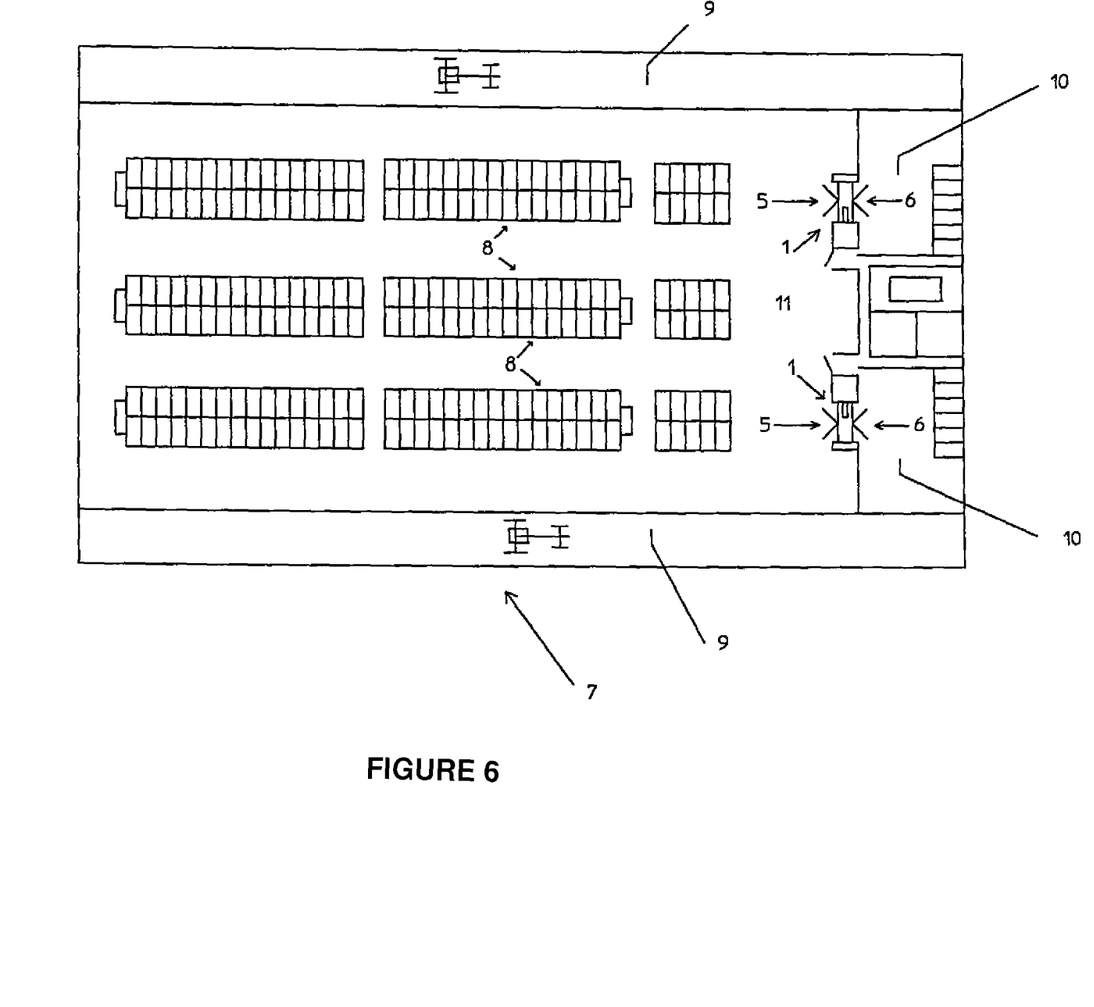
FIG. 6-FIG. 9 show several embodiments of the cow stable of the invention.

FIG. 6 shows a first embodiment of the cow stable 7 of the invention comprising resting boxes 8 for cows, milking boxes 1, at least one feeder trough 9, a separation zone or zones 10, and walking paths 11 allowing the cows to move between the resting boxes 8, milking boxes 1, the at least one feeder trough 9 and the separation zone or zones 10.

FIG. 6 clearly shows that in this embodiment but also in the embodiments to be discussed hereinafter with reference to the FIGS. 7-9, a milking box or boxes 1 according to the invention are applied. Further it is shown that at least the resting boxes 8 are placed at the first side 5 of the milking box or boxes 1, and that at the second side 6 of the milking box or boxes 1 the separation zone or zones 10 are located.

Figure 7:
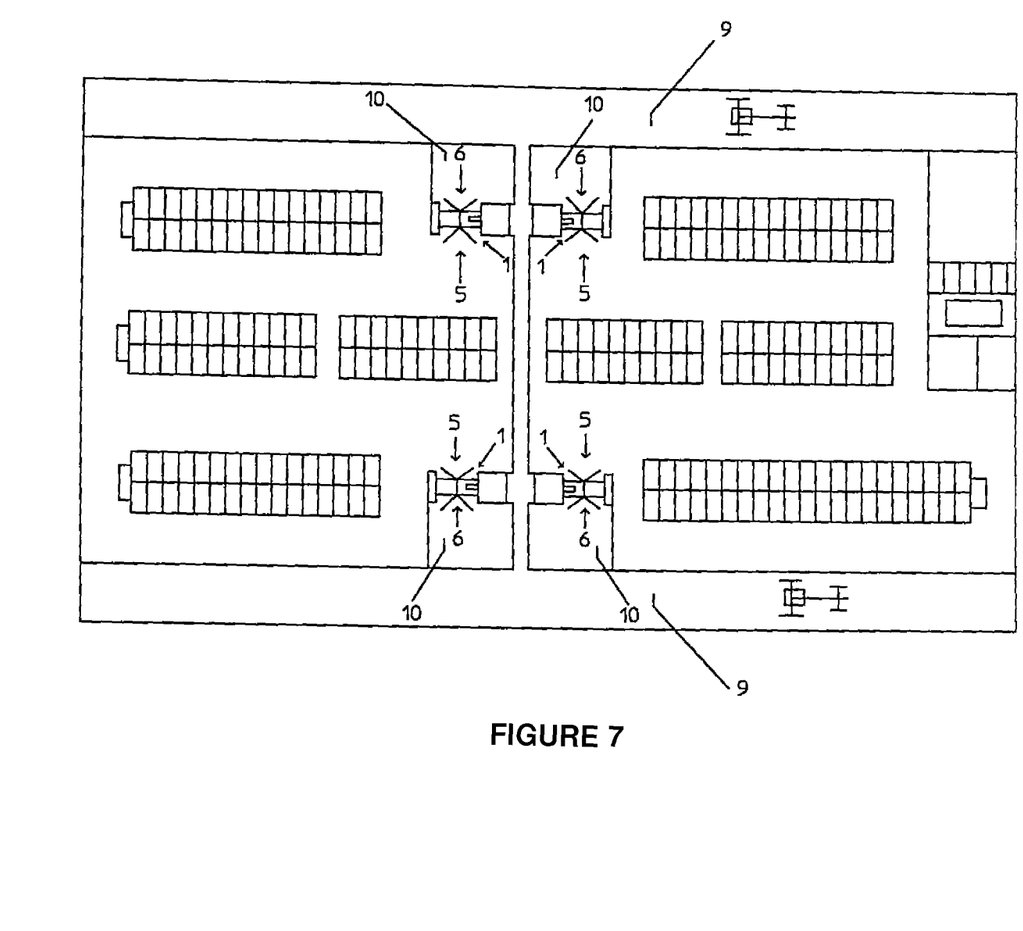

FIG. 7 shows a variation to the embodiment of FIG. 6, in which again at the second side 6 of the milking box or boxes 1 the separation zone or zones 10 are located. In this embodiment however the milking boxes 1 are placed approximately in the middle of the cow stable 7. Both the embodiment shown in FIG. 6 as the embodiment shown in FIG. 7 make it easy to selectively separate a cow which has entered the milking box 1 into a separation zone 10, and to have non-selected cows that leave the milking box 1 return to the part of the cow stable 7 from which they initially entered the milking box 1.

Figure 8:
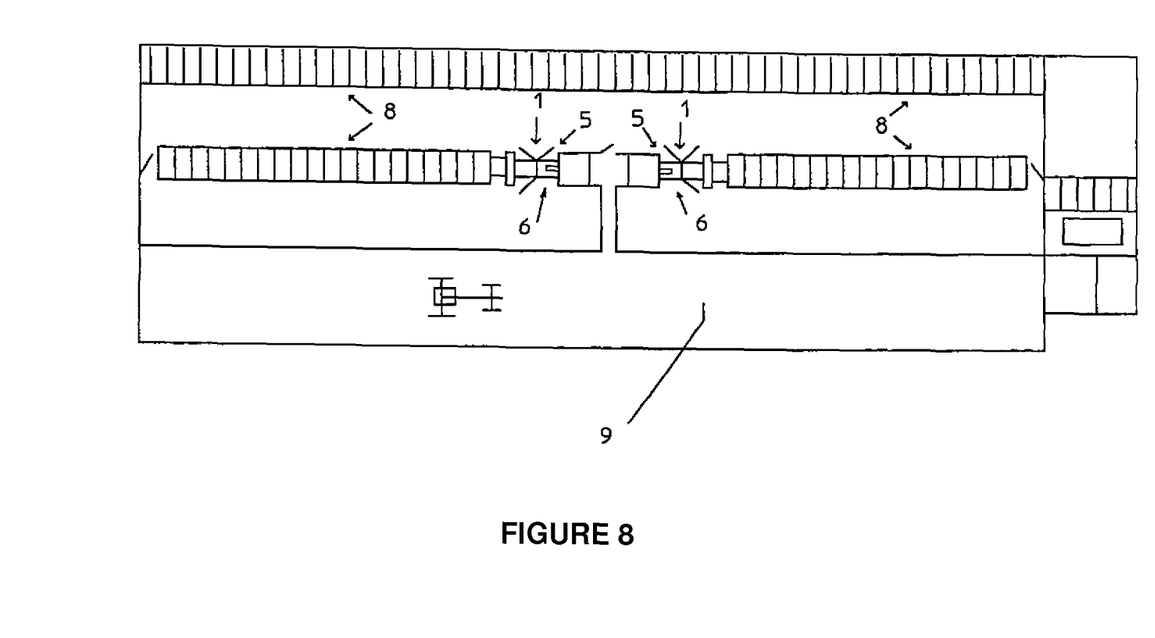

FIG. 8 shows a third embodiment of the cow stable 7 of the invention comprising resting boxes 8 for cows, milking boxes 1, and one feeder trough 9 which is placed at the second side 6 of the milking box 1. This construction makes it possible to secure that each cow that has entered the milking box 1 at its first side 5, leaves the milking box 1 after being milked at the second side 6 of the milking box 1, thus only then giving these cows access to the feeding trough 9.

Figure 9:
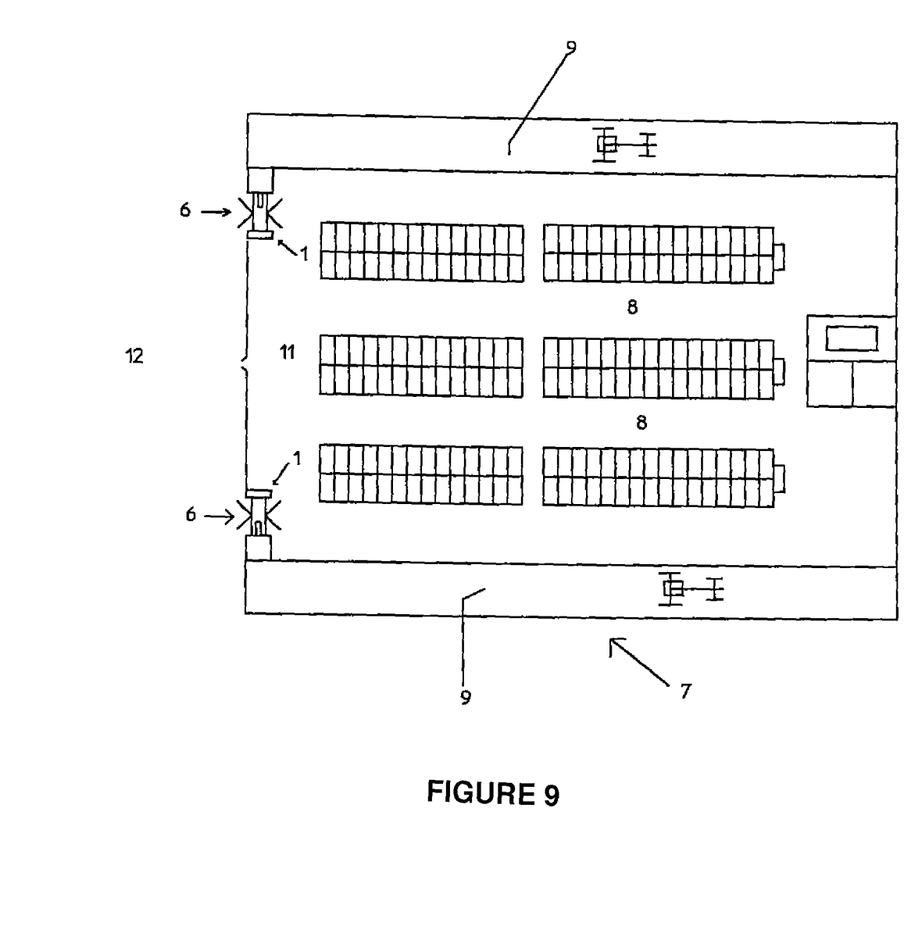

FIG. 9 shows a fourth embodiment of the cow stable 7 of the invention comprising resting boxes 8 for cows, milking boxes 1, at least one feeder trough 9, and walking paths 11 allowing the cows to move between the resting boxes 8, milking boxes 1, and the at least one feeder trough 9. In this construction the milking boxes 1 are placed in one of the walls of the cow stable 7 so as to cause that at the second side 6 of the milking box or boxes 1 the cow stable's outdoors 12 is located. This is a very easy and effective means to control without much labor the movement of the cows between the stable 7 indoors and outdoors 12, making it also possible to selectively have particular cows remain indoors, and other cows being allowed outdoors.

Whenever the cows enter the milking box 1 again for another milking operation, another decision can be made whether or not the cow that has been milked may go outdoors or must further remain inside of the stable 7.

What is claimed is:

1. A milking box, comprising:
   two entrance fences and two exit fences;
   wherein one first entrance fence and one first exit fence form a first pair of fences positioned at a first side of the milking box; and
   wherein one second entrance fence and one second exit fence form a second pair of fences positioned at a second side of the milking box which is opposite the first side.

2. A stable, comprising:
   at least one resting box;
   at least one milking box;
   at least one feeder trough;
   at least one separation zone; and
   at least one walking path between one or more of the at least one resting box, the at least one milking box, the at least one feeder trough, and the at least one separation zone;
   wherein at least the at least one resting box is placed at a first side of the at least one milking box;
   wherein at a second side of the at least one milking box is placed at least one feeder trough, a separation zone, a walking path, or outdoors; and
   wherein the milking box comprises:
      two entrance fences and two exit fences;
      wherein one first entrance fence and one first exit fence form a first pair of fences positioned at the first side of the milking box; and
      wherein one second entrance fence and one second exit fence form a second pair of fences positioned at the second side of the milking box which is opposite the first side.

3. A stable, comprising:
   a milking box having a first entrance fence and a first exit fence on a first side and a second entrance fence and a second exit fence on a second side opposite to the first side;
   a plurality of resting boxes positioned adjacent to the first side of the milking box;
   a walking path positioned between the resting boxes and the milking box; and
   a separation zone positioned adjacent to the second side of the milking box.

4. The stable of claim 3, wherein the milking box has a third side between the first side and the second side, the cow stable further comprising a feeding trough adjacent to the third side of the milking box.

5. A stable, comprising:
   a milking box having a first entrance fence and a first exit fence on a first side and a second entrance fence and a second exit fence on a second side opposite to the first side;
   a plurality of resting boxes positioned adjacent to the first side of the milking box;
   a walking path positioned between the resting boxes and the milking box; and
   a feeding trough positioned adjacent to the second side of the milking box.

6. The stable of claim 5, further comprising a separation zone positioned between the feeding trough and the milking box.

7. A stable, comprising:
   a milking box having a first entrance fence and a first exit fence on a first side and a second entrance fence and a second exit fence on a second side opposite to the first side;
   a plurality of resting boxes positioned adjacent to the first side of the milking box; and
   a walking path positioned between the resting boxes and the milking box;
   wherein the second side of the milking box is positioned adjacent to an outdoor area.

8. The stable of claim 7, wherein the milking box has a third side between the first side and the second side, the cow stable further comprising a feeding trough adjacent to the third side of the milking box.

* * * * *